United States Patent [19]

Smith et al.

[11] Patent Number: 4,474,911

[45] Date of Patent: Oct. 2, 1984

[54] OPACIFICATION OF PAINT

[75] Inventors: Philip M. Smith, Western Springs; Kenneth K. Hesler, West Chicago; John R. Lofstrom, Evanston; Ursula A. Sikorski, Chicago, all of Ill.

[73] Assignee: DeSoto, Inc., Des Plaines, Ill.

[21] Appl. No.: 448,257

[22] Filed: Dec. 9, 1982

[51] Int. Cl.$^3$ .............................................. C08K 7/16
[52] U.S. Cl. .................................. 523/220; 523/223; 524/413
[58] Field of Search ................. 523/220, 223; 524/413

[56] References Cited

U.S. PATENT DOCUMENTS 3,933,579 1/1976 Kershaw et al. ..................... 524/577
4,243,417 1/1981 Grourke et al. ..................... 524/413

FOREIGN PATENT DOCUMENTS 22633 1/1981 European Pat. Off. .

Primary Examiner—Lewis T. Jacobs
Attorney, Agent, or Firm—Dressler, Goldsmith, Shore, Sutker & Milnamow, Ltd.

[57] ABSTRACT

Aqueous satin paints are disclosed having improved hide at lowered titanium dioxide content in which the dispersed pigment is present in an amount providing a pigment volume concentration of from 25% to 50%, and in which the pigment contains from 30% to 60% of titanium dioxide, rutile, and the balance of the pigment consists essentially of pigmented vesiculated beads and opaque polymer particles in a ratio of 60/40 to 70/30.

7 Claims, No Drawings

OPACIFICATION OF PAINT

DESCRIPTION

1. Technical Field

This invention relates to the pigmentation of paint using a plurality of opacifying agents in order to enhance the hiding quality of the paint while minimizing the proportion of titanium dioxide which is present as well as the undesired softening of the paint.

2. Background Art

A conventional paint comprises a resinous binder which serves to hold together particles of pigment. These particles of pigment obscure the imperfections in the surface of the substrate which is painted, and this obscuring capacity is known as "hide". In modern paints, heavy reliance is placed upon the use of titanium dioxide, rutile, as the pigment because it contributes excellent hide. Unfortunately, this pigment is expensive.

Because of the expense of the titanium pigment, other pigments have been developed, including pigmented vesiculated beads and opaque polymer particles. Both of these are known articles of commerce for use in the paint industry and are less costly than titanium dioxide. However, the pigmented vesiculated beads do not entirely maintain the hide which is reduced in proportion to the amount of titanium which is replaced. The opaque polymer particles do enhance the hide, but these are soft and, when used in large amount, degrade the burnish resistance and scrub resistance of the final paint film.

Disclosure of Invention

In accordance with this invention, an aqueous satin paint having improved hide at lowered titanium dioxide content comprises water, a resin binder, and pigment dispersed in the water, this pigment being present in a pigment volume concentration (PVC) of from 25% to 50%, and the pigment contains from 30% to 60% of titanium dioxide, rutile, with the balance of the pigment consisting essentially of pigmented vesiculated beads and opaque polymer particles in a ratio of 60/40 to 70/30. By using such blends containing a minor proportion of opaque polymer particles with 30% to 60% of titanium dioxide (preferably at least 40%), the proportion of opaque polymer is too small to significantly impair the burnish resistance and the scrub resistance. At the same time, hide is improved more than the respective proportions of pigmented vesiculated beads and opaque polymer particles would suggest. This can be seen by graphing the hide at constant total pigment and constant titanium dioxide content with only one of the two replacements being used and then connecting the hide values so obtained by a straight line to show what blends should provide. The hide obtained by the claimed blends are significantly better than that straight line would suggest.

All proportions and ratios herein are by volume based on dry solids, unless otherwise specified.

This invention is applicable to paints in which the resin is dissolved or colloidally dispersed in the aqueous phase of the paint, but the invention is primarily adapted to latex paints in which the resin binder is constituted by particles of solid resin suspended (emulsified) in the aqueous continuum with the aid of a surfactant.

This invention is specifically concerned with "satin" paints. This term is well known in the latex paint industry and denotes a paint which deposits a film which, when dry, exhibits a 60° gloss meter reading in the range of 7–20 and an 85° gloss meter reading in the range of 15–70. Gloss meters report the proportion of light which is reflected. Thus, the mixture of pigments used herein is required to provide a paint having rather specific properties.

The opaque polymer particles employed herein are emulsion polymer particles of generally transparent water insoluble polymers having a sufficiently high glass transition temperature to avoid coalescence in the aqueous paints which are involved. These polymer particles have an average particle size in the range of 0.1–2.5 microns and contain microvoids which scatter incident light and thereby produce opacity. These microvoids can be provided in various ways, conveniently by first polymerizing in aqueous emulsion a swellable core polymer containing carboxylic acid groups, typically provided by from 5% to 50% by weight of acrylic acid or methacrylic acid, which enable the core to be swollen with a volatile amine or ammonia. A sheath of polymeric material is then emulsion polymerized around the acid-containing core. The sheathed particles are subjected to the volatile amine or ammonia in aqueous dispersion to swell the core, and the dispersion is dried to remove the swellant and provide a microvoid within the sheathed polymer particle. Typical opaque polymer particles and their production are disclosed in European patent application having Publication No. 0022633 A2 of Rohm and Haas Company. The microvoid-containing product of Example 1C of that disclosure is identified herein as opaque polymer A and will be used in the Examples of this application. In opaque polymer A, the core is a copolymer of 69.65% methyl methacrylate, 29.85% methacrylic acid, and 0.5% ethylene glycol diacrylate having an average particle diameter of 0.35 micron. This core has a swell ratio at pH 10 with ammonia of around 12, by volume. The described core is sheathed with polymerized methyl methacrylate to an average diameter of 1.0 micron and the sheathed particle is neutralized with ammonium hydroxide and heated to 95° C. to swell the particles to 1.15 micron before the ammonia is evaporated to provide an internal void.

The pigmented vesiculated beads which are used herein are generally larger than the opaque polymer particles and contain a plurality of small cells or vesicles whose walls are provided by the polymer of the beads. These beads have an average particle diameter of from 3 to 30 microns and contain from 10% to 60%, preferably from 30% to 55%, by weight (dry) of finely divided pigment, usually titanium dioxide, rutile. These vesiculated beads are available in commerce and are described in Kershaw et al. U.S. Pat. No. 3,933,579 dated Jan. 20, 1976. They are generally spheroidal with a ratio of bead diameter to mean vesicle diameter of at least 5:1.

The pigment volume concentration (PVC) is important to the provision of a superior satin paint. The narrow range of PVC described previously is thus a necessary aspect of this invention.

The small proportion of titanium dioxide used herein is also important. In preferred practice, the proportion of titanium dioxide, rutile, is at least 40%. This minimizes the cost of the paint at the same time that it maximizes the improvement in hide.

The intended use of the paint, such as for interior or exterior application, does not change the parameters of this invention. However, air dry paints are primarily contemplated herein because elevated curing temperatures which destroy the voids in the opaque polymer particles which help to create the desired opacity are counterproductive to this invention.

It should be appreciated that it is common in latex paints to include a proportion of extender particles which contribute little to the hide. Such extender particles, illustrated herein by silica or calcium carbonate, are sometime present in amounts up to about 20% of the total particulate content of the paint, but these do not alter the synergism of this invention.

It will also be evident that while the three pigments noted herein are to provide the desired opacity, one may still wish to add small amount of other pigments or colorants for special purposes, such as to provide desired coloration or to confer other optical effects. Thus, the pigmentation consists essentially of the three pigments which have been discussed since these determine the hiding capacity of the paint.

The invention will be illustrated in the examples which follow.

Example 1—Satin Paint

| Component | LBS. | Gallons | Gallons (non-volatile) |
|---|---|---|---|
| Titanium Dioxide, rutile | 207.64 | 7.20 | 7.20 |
| Opaque polymer particles | 40.87 | 4.75 | 2.40 |
| Pigmented vesiculated beads | 92.74 | 9.95 | 4.00 |
| Vinyl acrylic latex | 476.04 | 52.60 | 26.30 |
| Additives | 45.96 | 5.51 | 0.84 |
| Water | 166.52 | 19.99 | 0.00 |

This paint has a PVC of 34%, titanium dioxide constitutes 53% of the prime pigmentation and the ratio of pigmented vesiculated beads to opaque polymer particles is 62/38. The burnish resistance and scrub resistance are essentially the same as the same paint pigmented with only titanium dioxide, but the hide is almost as good despite the small amount of opaque polymer present.

Note 1: In the above example, the opaque polymer particles were provided by a commercial product called Rhopaque OP-42 marketed by Rohm & Haas of Philadelphia, Pa.

Note 2: In the above example, the pigmented vesiculated beads were provided by a commercial product called Spindrift PVB made by the Enterprise Companies, Wheeling, Ill.

Note 3: In the above example, the vinyl acrylic latex was an aqueous emulsion copolymer of 84% by weight vinyl acetate, 14% by weight n-butyl acrylate and 2% by weight of the 2-hydroxypropyl maleate ester of 2-hydroxyethyl ethylene urea. A suitable commercially available latex is UCAR 367 available from Union Carbide Corporation of New York.

Note 4: The additives are those normally used in the production of paints and include surfactants, thickeners, preservatives, fungicides, coalescing solvents, materials for the adjustment of pH, defoamers and driers. These are of no consequence in this invention.

What is claimed is:

1. An aqueous satin paint having improved hide at lowered titanium dioxide content comprising, water, a resin binder, and pigment dispersed in the water, said pigment being present in an amount providing a pigment volume concentration of from 25% to 50%, said pigment containing from 30% to 60% of titanium dioxide, rutile, and the balance of the pigment consisting essentially of a mixture of pigmented vesiculated beads and opaque polymer particles in a ratio of from 30/70 to 90/10, said opaque polymer particles having a glass transition temperature high enough to avoid coalescence in the aqueous paint, an average particle size in the range of 0.1–2.5 microns and containing light-scattering microvoids which provide these particles with their opacity.

2. An aqueous paint as recited in claim 1 in which said binder is an emulsion copolymer suspended in the water with the aid of a surfactant.

3. An aqueous paint as recited in claim 1 in which the proportion of titanium dioxide, rutile, is at least 40% of total pigment.

4. An aqueous latex paint as recited in claim 2 in which the proportion of titanium dioxide, rutile, is at least 40% of total pigment.

5. An aqueous paint as recited in claim 1 in which said vesiculated beads have an average particle diameter of from 3 to 30 microns and contain from 10% to 60%, based on their dry weight, of finely divided pigment.

6. An aqueous paint as recited in claim 5 in which the finely divided pigment in said vesiculated beads is titanium dioxide, rutile.

7. An aqueous latex paint as recited in claim 1 in which said paint is an air drying paint.

* * * * *